Patented Oct. 15, 1940

2,217,723

UNITED STATES PATENT OFFICE 2,217,723

SEALING COMPOSITION

Constant A. Benoit, Brooklyn, N. Y., assignor to Permatex Company, Inc., Sheepshead Bay, N. Y., a corporation of New York No Drawing. Application May 7, 1936, Serial No. 78,411

6 Claims. (Cl. 106—8)

My invention relates to packing and sealing materials and refers particularly to such materials adapted for use in internal combustion engines, pumps, tanks and pipe lines, and in other devices in which the sealed elements are subjected to heat, pressure, vibration and the reactions of chemicals.

In order to illustrate the valuable and advantageous properties of the subject matter of my invention, I will describe my products in relation to their application on flange surfaces seams and screw thread connections of an internal combustion engine and application on solid gaskets used in the latter, but their usefulness and value are not limited to devices of that character, as they are of equal value in the sealing of metallic parts, seams or gasket unions of other devices.

The reactions upon a sealing material, or gasket, in forming a perfect closure, or jointure, between the metallic parts of an internal combustion engine are most severe, as they are subjected to varying and high temperatures and pressures, to vibrations, to the action of cold and hot water, of steam and to such chemicals as gasoline, kerosene, fuel oil, hot and cold lubricating oils, greases, and anti-freeze preparations containing alcohol (methyl, ethyl and isopropyl), glycerine and ethylene glycol.

Because of these working conditions, special properties of the sealing material are required for satisfactory results, among which the following are mentioned:—as the parts to be joined may be covered with oil, and grease, these deleterious products must be removed from the metal surfaces as they have a tendency to prevent a proper jointure between the metal and the sealing material; the sealing material must have a tendency to attach itself to the faces of the metal parts or solid gaskets in order that there may be a binding effect between them; must be of such composition that it will not crumble, or disintegrate, under the severe conditions of operation; it must be of such composition that it will retain its sealing properties under the continual operation of the device; it must be of such composition that the sealed metallic elements of the device may be readily separated without injury to such parts; it must be of such composition that it will effectively seal metal parts, or solid gaskets, of irregular, or distorted faces which are not capable of perfect abutment; it must be of such composition that its effective ingredients will not be eliminated under use; it must be of such physical condition as to allow it to be readily applied to the metal or gasket surfaces and it must be capable of being applied to irregularities in the face of the metal or gasket surfaces. Other requirements of sealing materials for the described uses are evident to those familiar with their uses.

A successful and satisfactory sealing material, therefore, must retain its desirable and required properties to the highest degree under the severe conditions of operations.

It is evident that if any of the ingredients of a sealing material necessary for its proper functioning be adversely affected, dissolved, or removed, by the action of the heat, pressure, cold or hot water, steam, lubricating oils, greases, gasoline, kerosene, fuel oil, or anti-freeze preparations containing alcohol, glycerine or ethylene glycol during the operation of the particular device described, the seal will be broken and it will be ineffective, and that, hence, the effectiveness of the sealing material is largely dependent upon its resistance to these agents to which it is submitted.

The paste-like sealing materials to which my invention is particularly directed are usually composed of a gum and an oil which are insoluble in the reagents to which they are submitted during operation, both having a tenacious affinity for solid surfaces, particularly metal surfaces, to which mixture an organic solvent is preferably added to retain the gum and oil in uniform admixture, and inert ingredients, or fillers, sometimes added to give increased cementing strength and resistance.

Raw castor oil is the oil generally employed for this purpose, but experience has shown that while it possesses valuable properties it is not completely effective under extreme, or even ordinary conditions, and my invention consists in overcoming these deficiencies incident to the employment of raw castor oil and in the discovery of a sealing material of far superior value and usefulness.

Because of the solubility or miscibility, of raw castor oil, known commercially as "castor oil," in gasoline, gasoline-alcohol mixtures, gasoline-benzol mixtures and fuel oils, the sealing materials formed from such raw castor oil crumbles, or disintegrates, when they come into contact with these chemicals, or mixtures, under the temperatures and pressures incident to engine operations.

I have now found that far superior sealing materials can be produced by employment of blown castor oil or polymerized castor oil, the employment of which overcomes the difficulties incident to the use of raw castor oil and which produces a sealing material having all of the advantages previously mentioned as desirable in materials of this character.

I have found, further, that blown castor oil is substantially and practically insoluble, or immiscible, in gasoline, gasoline-alcohol mixtures, gasoline-benzol mixtures and fuel oils of ordinary occurrence in internal combustion engine operations or handled in tanks, pumps and pipe lines and that the sealing materials resulting from its use are far superior and more lasting in their sealing effect than those in which raw castor oil is employed.

I have found, further, that blown castor oil has a much greater affinity for metal surfaces than has raw castor oil, this affinity being such that it is not necessary to have the metal surfaces completely cleaned from oil and grease in order to produce a lasting seal which is not possible with raw castor oil in the use of which it is necessary that these surfaces have the oil and grease completely removed.

It is also to be noted that as blown castor oil is at least partially oxidized, while raw castor oil is unoxidized, the possibility of a chemical change in blown castor oil is greatly reduced thus causing a more uniform composition of the sealing material during prolonged employment.

Another important advantage of the use of blown castor oil instead of raw castor oil is that sealing mixtures containing blown castor oil have a tendency to remain in the original physical condition without separation of the ingredients for a much longer period of time than those containing raw castor oil, which is a valuable property in collapsible tube containers in which these products are largely sold, as there is no opportunity in such cases for mixing the separated ingredients before use.

Another important advantage possessed by my sealing material is the rapidity with which it can be applied and the certainty of the produced results. Sealing materials are applied to the surfaces to be attached in a thin layer and when they contain raw castor oil they should be allowed to "set" by the evaporation of a portion of the alcohol before the two parts are clamped, or bolted together. In the use of my composition containing blown castor oil, however, this "setting" is not necessary as the two parts may be clamped, or bolted, together without awaiting this "setting" operation.

In many cases the sealing material is placed upon the metal surfaces in layers of considerable thickness and when a raw castor oil material is thus employed the interior of the sealing material remains soft and is readily affected by gasoline, gasoline-alcohol mixtures, gasoline-benzol mixtures and fuel oil while in my blown castor oil material this objectionable feature is overcome because the soft sealing material is not affected by these liquids.

The sealing materials of my invention, therefore, are not only different in the chemicals employed from those in which raw castor oil is used, but this change of chemicals results in a product having valuable attributes not possessed by those in which raw castor oil is employed and hence it represents a great advance in the art to which it is directed.

I give the following as examples of the compositions of matter of my invention:

HEAVY SYRUPY LIQUIDS

Example 1

| | | |
|---|---|---|
| Manila gum | lbs | 14 |
| Isopropyl alcohol | gallons | 1 |
| "Pale blown castor oil" | do | 2½ |

Example 2

| | | |
|---|---|---|
| Philippine gum | lbs | 10 |
| Ethyl alcohol | gallons | 1 |
| "Number 15 blown castor oil" | do | 2 |

Example 3

| | | |
|---|---|---|
| Pontianak gum | lbs | 15 |
| Methyl alcohol | gallons | 1 |
| "Number 30 blown castor oil" | do | 2¼ |

SOFT DRYING PASTES

Example 4

| | | |
|---|---|---|
| Philippine gum | lbs | 6 |
| Ethyl alcohol | gallons | 1 |
| "Number 15 blown castor oil" | do | 1½ |
| Talc | lbs | 25 |

Example 5

| | | |
|---|---|---|
| Pontianak gum | lbs | 8 |
| Methyl alcohol | gallons | 1 |
| "Number 30 blown castor oil" | do | 1¾ |
| Silica | lbs | 25 |

HARD DRYING PASTES

Example 6

| | | |
|---|---|---|
| Manila gum | lbs | 8 |
| Isopropyl alcohol | gallons | 1 |
| "Pale blown castor oil" | do | ½ |
| Terra alba | lbs | 15 |

The desired consistency of the finished products may be obtained by employing a blown castor oil of the necessary viscosity, the greater the viscosity of the oil, the greater the viscosity of the final product, the proportions of the other ingredients being unchanged.

By "blown castor oils" I mean those oils which are obtained by oxidizing, or polymerizing, raw castor oil, irrespective of the means or degree of such oxidation or polymerization.

Among the gums suitable for the compositions of matter of my invention which have no chemical action upon the blown castor oils, organic solvents, or fillers used, are Pontianak gum, Manila gum, soluble copal, and Philippine gum whether in their natural state, refined or bleached condition, although I do not limit myself to these specific gums.

Among the organic solvents suitable for the compositions of matter of my invention which have no chemical action upon the gums, blown castor oils or fillers used, are ethyl alcohol, methyl alcohol, isopropyl alcohol, xyzol, benzol, toluol, ethyl, butyl and amyl acetates, methyl acetone, ethylene glycol mono-ethyl ether and carbon tetra chloride, although I do not limit myself to these specific solvents.

Among the inert materials, or fillers, suitable for the compositions of matter of my invention, and which have no chemical action upon the gums, blown castor oils or organic solvents employed, are talc, china clay, asbestos, mica, ochre, iron oxides, silica, infusorial earth, diatomaceous earth, terra alba and graphite although I do not limit myself to these specific inert materials or fillers.

Among the blown castor oils suitable for the compositions of matter of my invention which have no chemical action upon the gums, organic solvents or fillers used, are the blown castor oils known commercially as Pale blown castor oil, Baker's Number 15, Baker's Number 30 and Baker's Number 40, although I do not limit myself to these specific blown castor oils.

I do not limit myself, to the particular chemicals, quantities, temperatures or uses of the composition of matter of my invention specifically mentioned as these are given simply as a means for clearly describing my invention.

What I claim is:

1. A composition of matter capable of adaptation for sealing metallic parts of an internal combustion engine, said composition of matter containing blown castor oil and at least one member of the group of alcohol soluble gums consisting of Manila gum, soluble copal, Pontianak gum and Philippine gum and being practically unaffected by the conditions of said engine operations.

2. A composition of matter capable of adaptation for sealing metallic parts of an internal combustion engine, said composition of matter containing blown castor oil, at least one member of the group of alcohol soluble gums consisting of Manila gum, soluble copal, Pontianak gum and Philippine gum and an organic solvent for said blown castor oil and said gum, and being practically unaffected by the conditions of said engine operations.

3. A composition of matter capable of adaptation for sealing metallic parts of an internal combustion engine, said composition of matter containing blown castor oil, at least one member of the group of alcohol soluble gums consisting of Manila gum, soluble copal, Pontianak gum and Philippine gum, an organic solvent for said blown castor oil and said gum, and a filler, and being practically unaffected by the conditions of said engine operations.

4. A composition of matter capable of adaptation for sealing metallic parts of an internal combustion engine, said composition of matter containing blown castor oil and Manila gum, and being practically unaffected by the conditions of said engine operations.

5. A composition of matter capable of adaptation for sealing metallic parts of an internal combustion engine, said composition of matter containing blown castor oil, Manila gum and an organic solvent for said blown castor oil and said Manila gum and being practically unaffected by the conditions of said engine operations.

6. A composition of matter capable of adaptation for sealing metallic parts of an internal combustion engine, said composition of matter containing blown castor oil, Manila gum, a filler and an organic solvent for said blown castor oil and said Manila gum, and being practically unaffected by the conditions of said engine operations.

CONSTANT A. BENOIT.